(12) United States Patent
Moren

(10) Patent No.: US 9,027,530 B2
(45) Date of Patent: May 12, 2015

(54) METHOD OF EVALUATING A FUEL INJECTOR

(75) Inventor: Mats Moren, Torslanda (SE)

(73) Assignee: Volvo Lastvagner AB, Göteborg (SE)

( * ) Notice: Subject to any disclaimer, the term of this patent is extended or adjusted under 35 U.S.C. 154(b) by 170 days.

(21) Appl. No.: 13/979,552

(22) PCT Filed: Feb. 7, 2012

(86) PCT No.: PCT/SE2012/000012
§ 371 (c)(1),
(2), (4) Date: Jul. 12, 2013

(87) PCT Pub. No.: WO2012/108809
PCT Pub. Date: Aug. 16, 2012

(65) Prior Publication Data
US 2013/0317721 A1 Nov. 28, 2013

(30) Foreign Application Priority Data

Feb. 8, 2011 (WO) .................. PCT/SE2011/000022

(51) Int. Cl.
*F02B 3/00* (2006.01)
*G01M 15/04* (2006.01)
*F01N 3/025* (2006.01)
*F01N 3/20* (2006.01)

(52) U.S. Cl.
CPC ............. *G01M 15/048* (2013.01); *F01N 3/025* (2013.01); *F01N 3/2033* (2013.01); *F02M 2200/8092* (2013.01); *Y02T 10/26* (2013.01)

(58) Field of Classification Search
CPC ...... F02D 41/402; F01N 11/00; F01N 11/002
USPC ............ 123/299, 305, 399, 480, 568.21, 676; 60/272, 274, 299, 286, 303, 602; 701/101–103, 108, 109
See application file for complete search history.

(56) References Cited

U.S. PATENT DOCUMENTS 6,487,852 B1  12/2002 Murphy
7,412,965 B1* 8/2008 Laermann et al. ............ 123/399
(Continued)

FOREIGN PATENT DOCUMENTS

DE  102009014809 B3  4/2010
EP  1505271 A1  2/2005
EP  1835141 A2  9/2007

OTHER PUBLICATIONS

International search report (May 14, 2012) for corresponding International application No. PCT/SE2012/000012.

*Primary Examiner* — John Kwon
(74) *Attorney, Agent, or Firm* — WRB-IP LLP

(57) ABSTRACT

A method of calibration of at least one fuel injector for a fuel burner in an exhaust gas treatment system for an internal combustion engine is provided. The method is adapted for an exhaust gas system having the fuel burner mounted upstream of a diesel particle filter (DPF). The method of calibration is performed during an idle speed of the combustion engine, this to assure a constant temperature of the burner during the calibration. Hence, the method is started when a first steady tempera tore is registered in the fuel burner, wherein the at least one fuel injector, is operated with a first pulse width. A first temperature of an exhaust gas is registered directly downstream of the fuel burner. After this first temperature is registered, the pulse width, of the fuel injector changed into a second pulse width, which is different from the first pulse width.

18 Claims, 1 Drawing Sheet

(56) References Cited

U.S. PATENT DOCUMENTS

| | | |
|---|---|---|
| 2003/0111043 A1 | 6/2003 | Rodier |
| 2010/0139254 A1* | 6/2010 | Sebestyen et al. ............. 60/286 |
| 2011/0113756 A1 | 5/2011 | Yezerets et al. |
| 2011/0252768 A1* | 10/2011 | Baumann et al. ............... 60/274 |
| 2012/0255279 A1* | 10/2012 | Atluri et al. ..................... 60/274 |

* cited by examiner

METHOD OF EVALUATING A FUEL INJECTOR

BACKGROUND AND SUMMARY

The invention relates, according to an aspect thereof, to a method for evaluating and/or calibrating a fuel injector in a fuel burner in an exhaust gas treatment system for an internal, combustion engine.

Modern diesel combustion engines are equipped with a diesel particle filter (DPF) in the exhaust system. Soot from engine's combustion is trapped in the DPF. The soot is periodically cleaned out with oxidation (regeneration), whereas the exhaust temperature before the DPF is one key parameter. The temperature is often controlled by a burner. In order to minimize regeneration time, a gas temperature of approximately 600° C. is typically desired before the DPF. Normally, temperature needs to be controlled with a maximum temperature error of a few percent.

The fuel to the burner is diesel, controlled by a fuel injector. The oxygen to burn fuel in burner comes from rest oxygen from engine combustion. In case of high power burners, added oxygen is needed in order to burn sufficient amount of fuel. Methods to add this oxygen can be auxiliary air pumps or compressors.

For high performance burners, the burner will at some conditions run close to operating limits with respect to flame/combustion stability for the given design of the burner. Typical operations close to functional limits of burner are (A) high exhaust flow where very high burner power is required and (B) low exhaust flow where very low power of burner is needed. For burners with auxiliary air pumps or compressors connected to engine by fixed ratio to engine speed (gears or similar) two further points close to burner limitation need to be added: (C) low engine revs with high burner power and (D) high engine revs with low burner power.

The points described above, where the burner need to be run close to operating limits are characterized by either of following:

(A) Limitation of combustion time in burners combustion chamber
(B) Flame size/stability limitation
(C) Limitation of oxygen
(D) Flame size/stability limitation Consequences of limitations may be increased emissions or prolonged regeneration time.

Due to above physical limitation of burners, it is very important to have correct fuel to the burner. A correct fuel amount to the burner maximizes burner operation area and functionality. Incorrect fuel amount to the burner increases above limitations.

According to the above, a method is needed, which allows a reliable evaluation and/or calibration of the burner fuel injector, such that the fuel injector delivers a reliable and desirable amount of fuel during at least two, preferably three or more, more preferred all, operating conditions of the fuel injector.

It is desirable to suggest a method for evaluation of a fuel injector in an exhaust gas treatment system.

As such, the present disclosure relates to a method for evaluating the fuel injection accuracy of at least one fuel injector in an exhaust gas treatment system for an internal combustion engine, wherein the at least one fuel injector is mounted upstream of a diesel particle filter, the method comprising:

injecting fuel by the at least one fuel injector with a first pulse width, registering a first temperature of an exhaust gas downstream of the at least one fuel injector, injecting fuel by the at least one fuel injector with a second pulse width, the second pulse width being different from the first pulse width, whereby the at least one fuel injector is controlled in order to inject substantially the same amount of fuel during a time range as the amount of fuel that was injected using the first pulse width during a corresponding time range, registering a second temperature of an exhaust gas downstream of the at least one fuel injector, and determining a temperature difference between the first temperature and the second temperature.

As used herein, the expression "pulse width" includes a limited time interval during which fuel is injected from the at least one fuel injector. As such, when fuel is injected with a pulse width, substantially no fuel is injected between two subsequent pulses.

Preferably, the above method is performed during a constant temperature of a burner of which the at least one fuel injector forms a part. The fuel burner assumes a constant temperature when the temperature of the exhaust gases from the engine have a constant temperature, this occurs for example during idle speed of the engine or during an engine braking situation or any situation when the engine is driven in a steady state.

Preferably, the method may further comprise a step of calculating a correction factor for the at least one fuel injector dependent of the temperature difference.

Based upon the above discussed temperature difference, it is possible to assess whether the at least one fuel injector has an appropriate fuel injection accuracy or not. Purely by way of example, if the absolute value of the temperature difference is above a predetermined temperature threshold value, this may be an indication that the at least one fuel injector needs to be replaced and/or adjusted.

As another non-limiting example, the above discussed temperature difference may be used as an input to a calibration method wherein the characteristics of the at least one fuel injector, for instance as regards the fuel pressure and/or fuel flow rate, are calibrated.

The method of the present disclosure is based on the findings that for fuel injectors having a short pulse width, the spread between a desired and an actual amount of injected fuel is generally low for all fuel injectors. However with an increasing pulse width, the deviation of the actual injected amount of fuel and the desired amount of fuel is increasing. It is found that this deviation increases essentially linear with increased pulse width, whereby it is beneficial to perform an evaluation, and possibly also a calibration, of a fuel injector when it is operated with a long pulse width.

The above method further uses the long reaction time of the sensing means in the exhaust system, which smoothens fast variations in the temperature. That is, because the fuel is injected in pulses and not continuously, the actual temperature will be oscillating, however because of the relative long reaction time the measured temperature will be constant during a steady state operation of the fuel burner.

Optionally, the evaluation method is performed during an idle speed of the combustion engine.

Optionally, the second pulse width, is longer than the first pulse width.

Optionally, the second pulse width is at least five times greater, preferably eight times greater, than the first pulse width.

Optionally, the method further comprises, after fuel, has been injected with the second pulse width:
- injecting fuel by the at least one fuel injector with the first pulse width,
- registering a third temperature of an exhaust gas downstream of the at least one fuel injector, and
- determining a second temperature difference between the second temperature and the third temperature.

Optionally, the method is performed at start up, preferably every start up, of the vehicle.

Optionally, the method is performed after service, preferably after every service, of the vehicle.

A second aspect of the present disclosure relates to a method for calibrating at least one fuel injector for a fuel burner in an exhaust gas treatment system for an internal combustion engine, the method comprising:
- determining a temperature difference using an evaluation method according to the first aspect of the present disclosure, and
- adjusting at least one fuel injection characteristic of the at least one fuel injector in response to the temperature difference.

Purely by way of example, the at least one fuel injection characteristic may comprise at least one of the following characteristics: the fuel pressure of the fuel delivered to die at least one fuel injector or the fuel flow rate of the fuel leaving the at least one fuel injector. Purely by way of example, the fuel pressure may be controlled by a pump in communication with the at least one fuel injector. As such, the fuel pressure may be adjusted by adjusting the pump actuation.

Moreover, and again purely by way of example, the magnitude of the fuel flow rate may be controlled by the opening degree of one or more valves. Purely by way of example, the one or more valves may be located in the at least fuel injector as such or in one or more conduits connecting a fuel pump with the at least one fuel injector. As such, the fuel flow rate may be adjusted by adjusting the opening degree of the one or more valves.

Optionally, the method according to the second aspect further comprises:
- adjusting the at least one fuel injection characteristic associated with the first pulse width or the second pulse width in response to the temperature difference.

Optionally, the method according to the second aspect further comprises:
- adjusting the at least one fuel injection characteristic associated with the widest one of the first pulse width and the the second pulse width in response to the temperature difference.

It is desirable to suggest a method for calibration of a fuel injector in an exhaust gas treatment system, such that it during all conditions delivers a desired amount of fuel.

The method according to the third aspect of the present disclosure is based on the findings that for fuel injectors having a short pulse width, the spread between a desired and an actual amount of injected fuel is low for all fuel injectors. However with an increasing pulse width, the deviation of the actual injected amount of fuel and the desired amount of fuel is increasing. It is found that this deviation increases essentially linear with, increased pulse width, whereby it is beneficial to perform a calibration of a fuel injector when it operated with a long pulse width.

The third aspect of the present disclosure further rises the long reaction time of the sensing means in the exhaust system, which smoothers fast variations in the temperature. That is, because the fuel is injected in pulses and not continuously, the actual temperature win be oscillating, however because of the relative long reaction time the measured temperature will be constant during a steady state operation of the fuel burner.

A method of calibration of at least one fuel injector of a fuel burner in an exhaust gas treatment system for an internal combustion engine is therefore, according to the third aspect of the present disclosure, suggested. The method according to the third aspect of the present disclosure is adapted for an exhaust gas system having said fuel burner mounted upstream of a diesel particle filter (DPF). The method of calibration is performed during a constant temperature of the burner. The fuel burner becomes a constant temperature when the temperature of the exhaust gases from the engine have a constant temperature, this occurs for example during idle speed of the engine or during an engine braking situation or any situation when the engine is driven in a steady state.

The method, according to the third aspect of the present disclosure, is started when a first steady temperature Is registered in the fuel burner, wherein said at least one fuel injector is operated with a first pulse width, and thereby aiming to inject a first amount of fuel during a specific time period. A first temperature of an exhaust gas is registered directly downstream of the fuel burner. After this first temperature is registered, the pulse width of the fuel injector is changed into a second pulse width, which is different from the first pulse width, whereby the at least one fuel injector still aims to inject the same amount of fuel during the same time period.

If the fuel injector is correctly calibrated, a change in pulse width of the fuel injector will, over a predetermined time, not influence the total amount of injected fuel in the fuel burner, and therefore also not result in any change in temperature in the fuel burner. However an erroneous calibrated fuel injector will, with a changed pulse width, inject more or less fuel in the fuel burner during the same predetermined time, wherein the temperature in the fuel burner will rise or fall respectively. Since the exhaust gas from the engine has the same temperature during the whole calibrating process (performed in a steady state of the vehicle), any difference in temperature in the exhaust gas derives from a change in the amount of fuel that has been burned in the fuel burner.

Hence, after the pulse width of the fuel injector has been changed and a steady state of the system is has been achieved, then the second temperature of the exhaust gas directly downstream of the fuel burner is registered. The second temperature is compared with the first temperature, wherein a temperature difference between the first and the second temperatures is calculated. The temperature difference is a measure of the difference in injected fuel during said specific time period, and if the fuel injector is correctly calibrated this difference is equal to zero.

Thereby, since the spread of the injected fuel is linear and trough the temperature difference a correction factor for the at least one fuel injector can be calculated dependent of the temperature difference between the short and long pulse width. The correction factor corrects the difference in the amount of fuel that is injected with different pulse width, such that during a reference time, the same amount of fuel, is injected in the fuel burner independently of the pulse width of the fuel injector.

The method according to the third aspect of the present disclosure is preferably performed during an idle speed of the engine, when the engine has reached a steady state operating temperature.

As short pulse width is preferred, the pulse width of the at least one fuel injector is changed back to the first pulse width after the second temperature has been registered. A short pulse width assures a steady flow of fuel.

The method according to the third aspect of the present disclosure further comprises the step of changing a correction factor for the fuel injector. The calculated correction factor assures that the fuel injector always injects the correct amount of fuel. The correction factor compensates the error that occurs when the pulse width is increased and thereby assures that the amount of fuel injected during a specific period of time is independent of the pulse width.

A preferred first pulse width is 1/10 and a preferred second pulse width is 9/10, i.e. the short pulse width is nine times shorter than the long pulse width, whereby nine fuel injections with the short pulse width is supposed to be equal one fuel injection of the long pulse width. For example, with the short pulse width—1/10—, is during one time unit, nine fuel injections made and with the long pulse width—9/10—, is one fuel injection made during the same time unit, wherein with a correct calibrated fuel injector this results in the same amount of injected fuel.

The method according to the third aspect of the present disclosure can be performed at any suitable situation as long as the steady temperature condition is fulfilled, whereby normally is a new calibration of the fuel injector not needed continuously, therefore it is suggested that the method is performed at every start up of the vehicle or more preferably after a service of the vehicle. Once the fuel injector is calibrated, it normally has a stable functionality, whereby a new calibration must just be made when the fuel injector has been changed.

It should be noted that features of the third aspect of the present disclosure may be incorporated in the method according to the first aspect of the present disclosure and/or the method according to the second aspect of the present disclosure.

BRIEF DESCRIPTION OF THE DRAWINGS

The inventive method will be described more fully hereinafter with reference to the accompanying drawings. This invention may, however, be embodied in many different forms and should not be construed as limited to the example set forth herein. Rather, this example is provided so that this disclosure will be thorough and complete, and will fully convey the scope of the invention to those skilled in the art.

DETAILED DESCRIPTION

Figure 1:
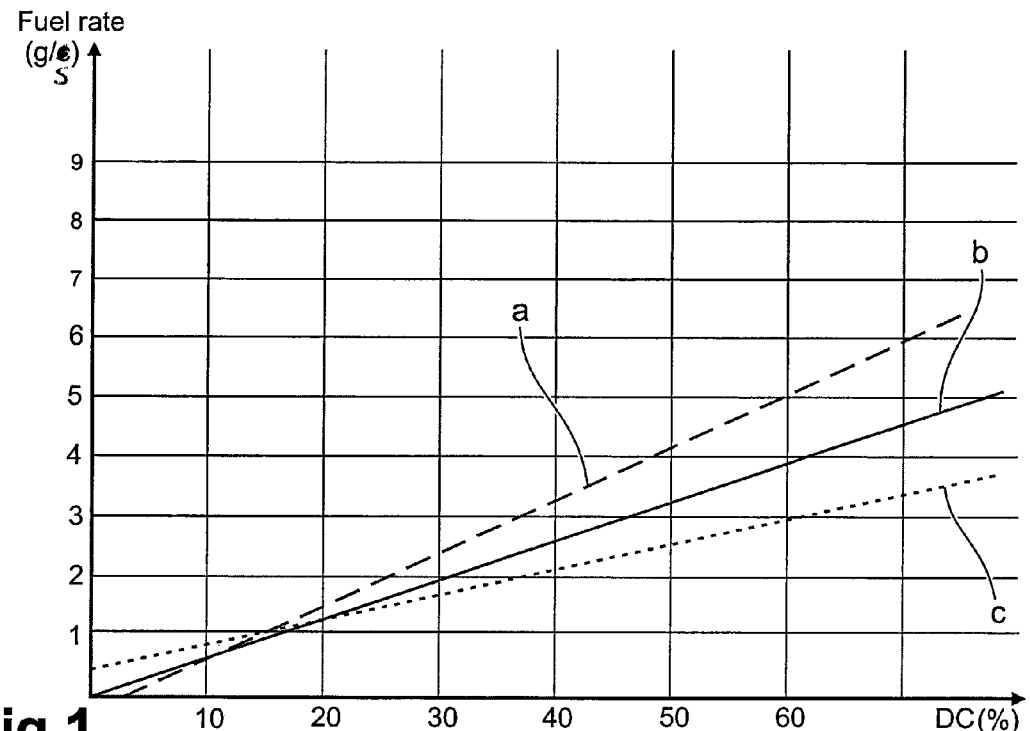
FIG. 1 shows a principle diagram of tolerances for three different fuel injectors.

FIG. 1 illustrates the difference in amount of injected fuel, for three different fuel injectors a, b, c dependent of the duty cycle DC they are operated in, for normal operation of the fuel injectors. During normal operation of a fuel injector a, b, c, the fuel injector is operated with the same frequency, wherein the pulse width PW is increased with an increased duty cycle. As can be seen in FIG. 1, the difference in the amount of injected fuel, for the three fuel injectors a, b, c is increased with a higher duty cycle DC. This difference can be derived, from falsely calibrated fuel injectors. Hence, during periods with high load on the engine, the precision of the fuel injectors decreases, since they are then operated with a long pulse width PW during the high duty cycle DC in order to inject the desired amount of fuel.

The invention, according to an aspect thereof, is based upon the idea that the fuel injector is operated with a high pulse width PW, normally used in a high duty cycle DC, during a low duty cycle DC. The invention, according to an aspect thereof, further uses the response time of the temperature sensors in the system, which is significant longer than the injection cycles, i.e. the temperature sensor in the system is not able response to temperature differences cause by a pulsating flow of fuel. Thereby, the temperature measurement in the system is not influenced by a changed pulse width PW.

Figure 2:
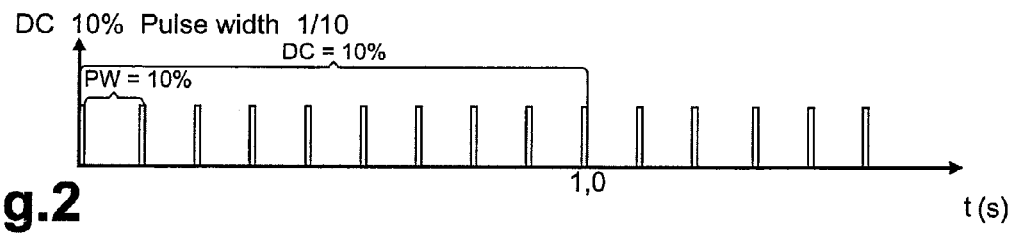
FIG. 2 shows a principle diagram of a 10% duty cycle for a fuel injector with a low pulse width.

FIG. 2 illustrates a short pulse width PW=1/10 during a low duty cycle DC, i.e. normal operation of the fuel injector dining idle.

Figure 3:
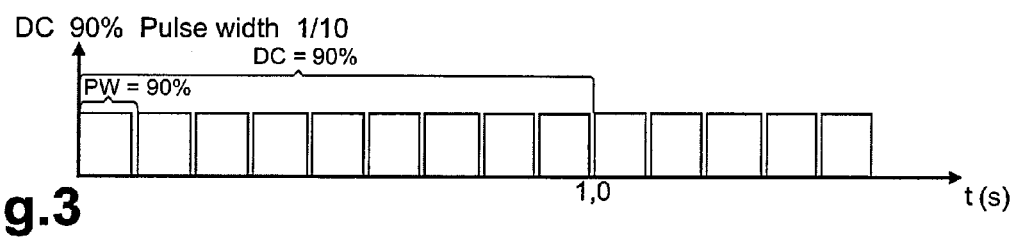
FIG. 3 shows a principle diagram of a 90% duty cycle for a fuel injector with a short pulse width.

FIG. 3 illustrates a Song pulse width PW=9/10 during a high duty cycle, i.e. normal operation of the fuel injector during a high load, i.e. a high duty cycle.

Figure 4:
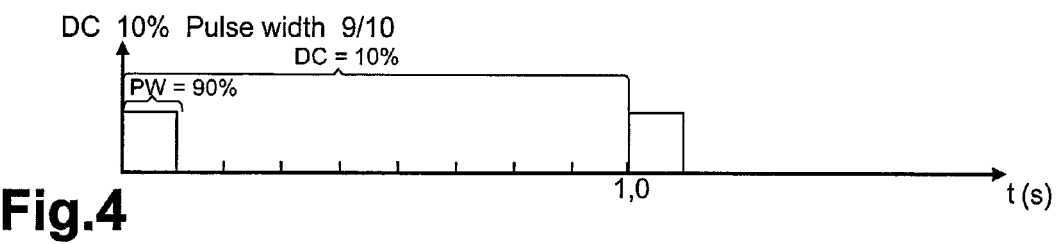
FIG. 4 shows a principle diagram of a 10% duty cycle for a fuel injector with a long pulse width.

FIG. 4 illustrates a long pulse width PW=9/10 during a low duty cycle, i.e. the mode in which the fuel injector may be operated during calibration according to the inventive method.

Hence, in the fuel injector in FIG. 2 nine pulses of fuel is injected during the same time period (1, 0 s) as 1 pulse of fuel is injected by the fuel injector in FIG. 4, however, the amount of fuel injected during this time period (1, 0 s) is supposed to be the same if the fuel injectors are correctly calibrated.

Because of the longer opening time of the fuel injector operated with a long pulse width, as in FIGS. 3 and 4, relative a fuel injector operated with a short pulse width, as in FIG. 2, the error of a falsely calibrated fuel injector will increase constantly with, a longer pulse width, as shown in FIG. 1.

Consequently, the present invention relates to a method for evaluating the fuel injection accuracy of at least one fuel injector in an exhaust gas treatment system for an internal combustion engine. The at least one fuel injector is mounted upstream of a diesel particle filter.

The above method may also be referred to as a diagnosing method.

The method comprises the following:

Injecting fuel by the at least one fuel injector with a first pulse width (e.g. PW=1/10 as is illustrated in FIG. 2).

Registering a first temperature of an exhaust gas downstream of the at least one fuel injector. Preferably, the first temperature is registered while the at least one fuel injector injects fuel with the first pulse width. As another non-limiting option, the first temperature may be registered immediately (e.g within 5 seconds, preferably within one second) after the fuel injection with the first pulse width has been terminated.

Injecting fuel by the at least one fuel injector with a second pulse width (e.g. PW=9/10 as is illustrated in FIG. 4), the second pulse width being different from, the first pulse width, whereby the at least one fuel injector is controlled in order to inject substantially the same amount of fuel during a time range as the amount of fuel that was injected using the first pulse width during a corresponding, preferably substantially identical, time range.

In other words, during the injection with the second pulse width, the at least one fuel injector is operated such that the total amount of fuel that is injected, i.e. the sum of the fuel injected during all the pulses, during a certain time range is the same amount of fuel that would have been injected when the fuel is injected by the first pulse width instead. As a non-limiting example, the above discussed time range may be one second or more.

Purely by way of example, this may be achieved by adjusting the temporal distance between subsequent pulses with the second pulse width. As another non-limiting example, the fuel flow rate through the at least one fuel injector during the second pulse width may adjusted. The above two examples may also be combined.

The method of the present invention further comprises registering a second temperature of an exhaust gas downstream of the at least one fuel injector, and determining a temperature difference between the first temperature and the second temperature. Preferably, the second temperature is registered while the at least one fuel injector injects fuel with the second pulse width. As another non-limiting option, the second temperature may be registered immediately (e.g within 5 seconds, preferably within one second) after the fuel injection with the second pulse width has been terminated.

Preferably, the second pulse width is at least five times greater, preferably eight times greater, than the first pulse width. In the Example illustrated in FIGS. 2 and 4, the second pulse width is nine times greater than the first pulse width. Moreover, before the fuel is injected by the first, pulse width, a first steady temperature in the fuel burner is preferably firstly determined.

Purely by way of example, the shortest pulse width of the first and second pulse widths may be within the range of 0.001-0.2 s, preferably within the range of 0.001-0.04 s, more preferred within the range of 0.004-0.015 s.

Purely by way of example, based on the temperature difference thus determined, a calibration of the at least one fuel injector may be performed.

For instance, a calibration may be performed in accordance with a method for calibrating at least one at least one fuel injector for a fuel burner in an exhaust gas treatment system for an internal combustion engine, the method comprising:
  determining a temperature difference using an evaluation method according to the first aspect of the present disclosure, and
  adjusting at least one fuel injection characteristic of the at least one fuel injector in response to the temperature difference.

Purely by way of example, the at least one fuel injection characteristic may comprise at least one of the following characteristics: the fuel pressure of the fuel delivered to the at least one fuel injector or the fuel flow rate of the fuel leaving the at least one fuel injector. Purely by way of example, the fuel pressure may be controlled by a pump in communication with the at least one fuel injector. As such, the fuel pressure may be adjusted by adjusting the pump actuation.

Moreover, and again purely by way of example, the magnitude of the fuel flow rate may be controlled by the opening degree of one or more valves. Purely by way of example, the one or more valves may be located in the at least fuel injector as such or in one or more conduits connecting a fuel pump with the at least one fuel injector. As such, the fuel flow rate may be adjusted by adjusting the opening degree of the one or more valves.

As will be realised, the invention, according to an aspect thereof, is capable of modification in various obvious respects, all without departing from the scope of the appended claims. Accordingly, the drawing and the description thereto are to be regarded as illustrative in nature, and not restrictive.

Moreover, it should be noted that the third aspect of the present disclosure could be described by the below point.

1. Method of calibration of at least one fuel injector for a fuel burner in an exhaust gas treatment system for an internal combustion engine, wherein the fuel burner is mounted upstream of a diesel particle filter (DPF), and wherein said at least one fuel injector is operated with a first pulse width, and said method comprises the steps of;
  registering a first steady temperature in the fuel burner, registering a first temperature of an exhaust gas directly downstream of the fuel burner,
  changing to a second pulse width of the fuel injector, and when a second steady temperature in the fuel burner is achieved, further comprises the steps of;
  registering a second temperature of the exhaust gas directly downstream of the fuel burner,
  calculating a temperature difference between the first and the second temperature,
  calculate a correction factor (k) for the at least one fuel injector dependent of the temperature difference.

Furthermore, it should be noted that optional embodiments of the third aspect of the present disclosure could be described by any one of the below points.

2. Method according to point 1, wherein the method of calibration is performed during an idle speed of the combustion engine.

3. Method according to point 1 or 2, wherein, the second pulse width is longer than the first PW 4. Method according to any of the preceding points, wherein the method further comprises the step of,
  changing the at least one fuel injector back to said first pulse width.

5. Method according to any of the preceding points, wherein the method further comprises, the step of;
  changing a correction factor (k) for the fuel injector such that the first temperature is achieved at both the first and the second pulse width.

6. Method according, to any of the preceding points, wherein the first pulse width is 1/10 and the second pulse width is 9/10.

7. Method according to any of the preceding points, wherein the method is performed at every start up of the vehicle.

8. Method according to any of the preceding points, wherein the method is performed after every service of the vehicle.

The invention claimed is:

1. A method for evaluating the fuel injection accuracy of at least one fuel injector in an exhaust gas treatment system for an internal combustion engine, wherein the at least one fuel injector is mounted upstream of a diesel particle filter (DPF), the method comprising:
  injecting fuel by the at least one fuel injector with a first pulse width,
  registering a first temperature of an exhaust gas downstream of the at least one fuel injector,
  injecting fuel by the at least one fuel injector with a second pulse width, the second pulse width being different from the first pulse width, whereby the at least one fuel injector is controlled in order to inject substantially the same amount of fuel during a time range as the amount of fuel that was injected using the first pulse width during a corresponding time range,
  registering a second temperature of an exhaust gas downstream of the at least one fuel injector, and
  determining a temperature difference between the first temperature and the second temperature.

2. Method according to claim 1, wherein the evaluation method is performed during an idle speed of the combustion engine.

3. Method according to claim 1, wherein, the second pulse width is longer than the first pulse width.

4. Method according to claim 3, wherein the second pulse width is at least five times greater, preferably eight times greater, than the first pulse width.

5. Method according to claim 1, wherein the method further comprises, after fuel has been injected with the second pulse width:
- injecting fuel by the at least one fuel injector with the first pulse width,
- registering a third temperature of an exhaust gas downstream of the at least one fuel injector, and
- determining a second temperature difference between the second temperature and the third temperature.

6. Method according to claim 1, wherein the method is performed at start up of the vehicle.

7. Method according to claim 1, the method is performed after service of the vehicle.

8. A method for calibrating at least one at least one fuel injector for a fuel burner in an exhaust gas treatment system for an internal combustion engine, the method comprising:
- determining a temperature difference using an evaluation method according to any one of the preceding claims, and
- adjusting at least one fuel injection characteristic of the at least one fuel injector in response to the temperature difference.

9. The method according to claim 8, wherein the method further comprises:
- adjusting the at least one fuel injection characteristic associated with the first pulse width or the second pulse width in response to the temperature difference.

10. The method according to claim 9, wherein the method further comprises:
- adjusting the at least one fuel injection characteristic associated with the widest one of the first pulse width and the second pulse width in response to the temperature difference.

11. Method of calibration of at least one fuel injector for a fuel burner in an exhaust gas treatment system for an internal combustion engine, wherein the fuel burner is mounted upstream of an diesel particle filter (DPF), and wherein the at least one fuel injector is operated with a first pulse width, and the method comprises the steps of;
- registering a first steady temperature in the fuel burner,
- registering a first temperature of an exhaust gas directly downstream of the fuel burner,
- changing to a second pulse width of the fuel injector, and when a second steady temperature in the fuel burner is achieved, further comprises the steps of;
- registering a second temperature of the exhaust vas directly downstream of the fuel burner,
- calculating a temperature difference between the first and the second temperature,
- calculate a correction factor (k) for the at least one fuel injector dependent of the temperature difference.

12. Method according to claim 11, wherein the method of calibration is performed during an idle speed of the combustion engine.

13. Method according to claim 11, wherein, the second pulse width is longer than the first PW.

14. Method according to claim 11, wherein the method further comprises the step of,
- changing the at least one fuel injector back to the first pulse width.

15. Method according to claim 11, wherein the method further comprises the step of;
- changing, a correction factor (k) for the fuel injector such that the first temperature is achieved at both the first and the second pulse width.

16. Method according to claim 1, wherein the first pulse width is 1/10 and the second pulse width is 9/10.

17. Method according to claim 1, wherein the method is performed at every start up of the vehicle.

18. Method according to claim 1, wherein the method is performed after every service of the vehicle.

* * * * *

UNITED STATES PATENT AND TRADEMARK OFFICE
CERTIFICATE OF CORRECTION

PATENT NO. : 9,027,530 B2
APPLICATION NO. : 13/979552
DATED : May 12, 2015
INVENTOR(S) : Mats Moren It is certified that error appears in the above-identified patent and that said Letters Patent is hereby corrected as shown below:

Title page, item (73) the assignee's name was incorrectly spelled as "Volvo Lastvagner AB" and it should be spelled as --Volvo Lastvagnar AB--.

Signed and Sealed this
Eighteenth Day of August, 2015

Michelle K. Lee
*Director of the United States Patent and Trademark Office*